United States Patent
Rolf

(10) Patent No.: US 10,395,520 B2
(45) Date of Patent: Aug. 27, 2019

(54) METHOD AND APPARATUS FOR CONSTRUCTING A TRAFFIC MODEL

(71) Applicant: HERE GLOBAL B.V., Eindhoven (NL)

(72) Inventor: Daniel Rolf, Berlin (DE)

(73) Assignee: HERE Global B.V., Eindhoven (NL)

( * ) Notice: Subject to any disclaimer, the term of this patent is extended or adjusted under 35 U.S.C. 154(b) by 115 days.

(21) Appl. No.: 15/383,822

(22) Filed: Dec. 19, 2016

(65) Prior Publication Data

US 2018/0174445 A1    Jun. 21, 2018

(51) Int. Cl.
  G08G 1/01        (2006.01)
  G01C 21/34       (2006.01)
(52) U.S. Cl.
  CPC ....... G08G 1/0129 (2013.01); G01C 21/3492 (2013.01)
(58) Field of Classification Search
  None
  See application file for complete search history.

(56) References Cited

U.S. PATENT DOCUMENTS

| | | | |
|---|---|---|---|
| 6,317,686 B1* | 11/2001 | Ran | G01C 21/3691 701/117 |
| 8,108,501 B2 | 1/2012 | Birnie et al. | |
| 2002/0177947 A1* | 11/2002 | Cayford | G01C 21/30 701/445 |
| 2008/0082251 A1* | 4/2008 | Ishikawa | G08G 1/0104 701/118 |
| 2014/0278052 A1 | 9/2014 | Slavin et al. | |
| 2017/0350715 A1* | 12/2017 | Tanizaki | G01C 21/34 |

FOREIGN PATENT DOCUMENTS

CN    102288193 A    12/2011
JP    2004118700 A  *  4/2004

OTHER PUBLICATIONS

Bertsimas, D. et al., *Data-Driven Estimation in Equilibrium Using Inverse Optimization*, Math. Program., Ser. A, Article No. 0819, Springer-Verlag Berlin Heidelberg and Mathematical Optimization Society (2014) 39 pages.

(Continued)

*Primary Examiner* — Mussa A Shaawat
*Assistant Examiner* — Abdhesh K Jha
(74) *Attorney, Agent, or Firm* — Alston & Bird LLP

(57) ABSTRACT

A method, apparatus and computer program product are provided to more accurately construct a traffic model. In regards to a method, links of a second traffic model are categorized as being either observed or unobserved. A link is observed if a most likely route through a first traffic model transits over the link and includes at least a predetermined number of probe data points. Separately for an unobserved graph comprised of unobserved links and an observed graph comprised of observed links, the method determines a fastest path between common nodes that appear in each of the unobserved and observed graphs. In an instance in which the fastest path in the unobserved graph is at least as fast as the fastest path in the observed graph, a travel time penalty is added to a travel time of the unobserved link in a second traffic model, subsequent to the first traffic model.

24 Claims, 5 Drawing Sheets

(56) References Cited

OTHER PUBLICATIONS

Codeca, L. et al., *Improving Traffic in Urban Environments Applying the Wardrop Equilibrium*, IEEE (2013) 6 pages.
Davis, L. C., *Realizing Wardrop Equilibria With Real-Time Traffic Information*, Physica A: Statistical Mechanics and Its Applications, vol. 388, Issue 20 (Oct. 15, 2009) 50 pages.
Ran, B. et al., *Traffic Speed Data Imputation Method Based on Tensor Completion*, Computational Intelligence and Neuroscience, vol. 2015, Article ID 364089 (2015) 9 pages.

* cited by examiner

METHOD AND APPARATUS FOR CONSTRUCTING A TRAFFIC MODEL

TECHNOLOGICAL FIELD

A method, apparatus and computer program product are provided in accordance with an example embodiment in order to construct a traffic model and, more particularly, to more accurately utilize a historic traffic profile in conjunction with the construction of a traffic model.

BACKGROUND

A number of applications, such mapping and navigation applications, rely upon the construction of a traffic prediction model. Although traffic prediction models may be constructed in various manners, some traffic prediction models rely upon a combination of a historic traffic profile and current or real time probe data, such as gathered from various probe sources currently transiting over the roadways. In order to combine the historic traffic profile and the real time probe data, the traffic prediction model determines a weighted average of the real time probe data and historic traffic information derived from the historic traffic profile. The manner in which the real time probe data and the historic traffic information are weighted depends upon the number of available real time probe data points. As more real time probe data points are available, the weighting of the real time probe data increases and the weighting of the historic traffic information correspondingly decreases, thereby creating a bias toward the real time probe data. Conversely, when fewer real time probe data points are available, the weighting of the real time probe data decreases and the weighting of the historic traffic information correspondingly increases, thereby creating a bias toward the historic traffic information.

In certain situations, this technique for constructing a traffic prediction model and, in particular, the manner in which the real time probe data and the historic traffic information are weighted may create unintended and inaccurate results. For example, in an instance in which the traffic flow along a link is slow, fewer vehicles will pass along the link in any particular period of time, thereby resulting in the collection of fewer probe data points along the link. As such, the traffic prediction model may be constructed by more heavily weighting the historic traffic information and more lightly weighting the real time probe data as a result in the reduction in the quantity of real time probe data for the respective link. In an extreme situation, the traffic may be completely blocked along the link so that no real time probe data is received relative to the respective link. In this extreme situation, the historic traffic information may be even more greatly weighted and the real time probe data may be even more lightly weighted. In this regard, the absence of real time probe data along the link may cause the traffic prediction model to be entirely based upon historic traffic information with no reliance upon real time probe data.

As the traffic prediction model places greater weight upon the historic traffic information in instances in which the traffic flow along a respective link is much slower than normal or completely blocked, the greater reliance upon historic traffic information may generate inaccurate results since the historic traffic information generally represents the average flow of traffic along the respective link and not the much slower flow of traffic that is experienced when the link is partially or fully blocked or when the traffic is sluggish for whatever reason. Thus, the resulting traffic prediction model may paint an inaccurate picture as to the traffic conditions along the respective link by predicting that the traffic is progressing at an average flow rate based upon the historic traffic information as opposed to predicting the sluggish or blocked traffic conditions actually experienced by the link.

In conjunction with navigation and other mapping applications, a router employs a greedy minimization strategy with reliance upon the traffic prediction model to generate a route that minimizes the cost between two points, such as an origin and a destination. The cost to be minimized by the router may be the estimated travel time along a route which, in turn, is generally inversely proportional to the speed of travel along the links that comprise the route. The cost function to be minimized by the router may be a random distribution around the real cost, that is, the estimated travel time along the route having natural noise. In this regard, the fewer real time probe data points that are utilized to estimate the cost of a respective link, the greater the local noise and thus the higher the optimistic bias for routing. As a result of its implementation of the greedy minimization strategy, the router is configured to be biased toward links which are currently underestimating the real cost in the course of minimizing the cost between two points. Thus, in instances in which traffic along a link is slowed or blocked and the traffic prediction model relies more greatly upon historic traffic information which overestimates the speed of travel along the respective link, the router may frequently select the links that are, in fact, slowed or blocked as a result of the overestimated speed of travel along the link. Thus, a driver may be directed along a route that includes links that are slowed or blocked which may understandably decrease the user experience as well as the confidence that the driver has in the navigation system. Correspondingly, the estimated time of arrival at the destination that is calculated by the navigation system may prove to be inaccurate as a result of the reliance upon the traffic prediction model that, in turn, more greatly relies upon historic traffic information which may not be appropriate for links that are slowed or blocked.

By way of example, a grid of roadways may exist in which the real speed of traffic along each of the roadways is 30 miles per hour (mph). The natural local noise of the real speed along each of the roadways of this example is 50%. In an instance in which there are very few real time probe data points, the traffic prediction model may more greatly weight historical traffic data such that the speed of every link is within a range of 15 mph to 45 mph, e.g., 30 mph +/− 50%. As such, for a fixed route that includes more than two links, the local random noise will be smoothed or cancelled. However, a router configured to minimize the time of travel along a route will be biased toward the selection of links having a speed of travel of 45 mph. As such, the resulting route may take odd and indirect detours in an effort to remain upon links that appear to have a current speed of 45 mph and to avoid links that appear to have a current speed of 30 mph or even 15 mph. As each link actually has approximately the same real speed of travel, the resulting route generated by the router may, in fact, take longer to traverse than a more direct route between the origin and the destination. Thus, the route generated by the router based upon the traffic prediction model may be suboptimal and the estimated time of arrival based upon a route including links apparently supporting traffic at a speed of 45 mph when, in reality, the traffic is moving along the links at 30 mph may also be overly optimistic.

As another example, a section of a highway may be experiencing a traffic jam. As such, multiple probe data points are available from vehicles mired within the traffic jam such that the traffic prediction model may accurately predict the speed along that segment of the highway. However, a small number of vehicles may transit along a ramp connected to the segment of the highway that is experiencing the traffic jam such that there are a small number of real time probe data points associated with the ramp. The traffic prediction model may therefore determine that the traffic flow along the ramp is proceeding at a much greater speed than the traffic flow along the section of the highway that is experiencing the traffic jam and a router relying upon the traffic prediction model may suggest routes for drivers that includes travel along the ramp. However, if the ramp were, in fact, a better and faster alternative to the section of the highway experiencing the traffic jam, many drivers would actually be using the ramp to take advantage of the increased rate of travel along the ramp so as to avoid, at least in part, the traffic jam experienced by the section of the highway. In this example, however, the Nash equilibrium postulate suggests that the few number of real time probe data points associated with the ramp actually indicates that the ramp is not a viable alternative to the section of the highway experiencing the traffic jam such that the route generated by the router based upon the traffic prediction model that recommends travel along the ramp will be suboptimal.

BRIEF SUMMARY

A method, apparatus and computer program product are provided in accordance with an example embodiment for more accurately constructing a traffic model. In this regard, the method, apparatus and computer program product of an example embodiment consider both probe data points, such as real time probe data points, and historic traffic information in a more informed manner in order to generate a more accurate traffic model, such as for use by a routing and navigation system. Thus, in instances in which traffic along a link is sluggish or blocked and there are few probe data points along the respective link, the method, apparatus and computer program product of an example embodiment may add a travel time penalty in some situations to the travel time otherwise predicted along the respective link based upon the historic traffic information so as to reduce the likelihood of an inaccurate and overly optimistic prediction for the respective link. Thus, the routes that are constructed and the times of arrival that are estimated based upon the traffic model constructed in accordance with an example embodiment of the present invention may be more accurate and reliable.

In one embodiment, a routing and navigation system is provided which includes a communication interface configured to receive probe data points. The routing and navigation system also includes at least one processor configured to categorize links of a second traffic model as being either observed or unobserved based upon an evaluation of a first traffic model associated with a point in time prior to the point in time represented by the second traffic model. A link is observed in an instance in which a most likely route through the first traffic model transits over the link and includes at least a predetermined number of the probe data points received by the communication interface. The at least one processor is also configured to determine, separately for an unobserved graph comprised of unobserved links and an observed graph comprised of observed links, a fastest path between common nodes that appear in each of the unobserved graph and the observed graph. In an instance in which the fastest path in the unobserved at least as fast as the fastest path in the observed graph, the at least one processor is configured to add a travel time penalty to a travel time of the unobserved link in the second traffic model, subsequent to the first traffic model. The processor is configured to complete construction of the second traffic model including the travel time penalty added to the travel time of the unobserved link. The routing and navigation system further includes a route planning component configured to utilize the second traffic model in conjunction with construction of a route.

In an instance in which the fastest path in the unobserved graph is at least as fast as the fastest path in the observed graph, the at least one processor of an example embodiment is configured to establish the travel time of the unobserved link in the second traffic model based upon at least one of a speed limit associated with the unobserved link or historical speed over the unobserved link but without the travel time penalty. The at least one processor of an example embodiment is configured to add a travel time penalty to a travel time of the unobserved link in the second traffic model by adding the travel time penalty such that the fastest path in the unobserved graph is slower than the fastest path in the observed graph, such as by at least a predetermined amount.

In an example embodiment, a method for constructing a traffic model is provided that includes categorize links of a second traffic model as being either observed or unobserved based upon an evaluation of a first traffic model associated with a point in time prior to the point in time represented by the second traffic model. A link is observed in an instance in which a most likely route through the first traffic model transits over the link and includes at least a predetermined number of probe data points. Separately for an unobserved graph comprised of unobserved links and an observed graph comprised of observed links, the method also includes determining a fastest path between common nodes that appear in each of the unobserved graph and the observed graph. In an instance in which the fastest path in the unobserved graph is at least as fast as the fastest path in the observed graph, the method adds a travel time penalty to a travel time of the unobserved link in a second traffic model, subsequent to the first traffic model. The method further includes completing construction of the second traffic model including the travel time penalty added to the travel time of the unobserved link.

In an instance in which the fastest path in the unobserved graph is faster than the fastest path in the observed graph, the method of an example embodiment also includes establishing the travel time of the unobserved link in the second travel model based upon at least one or a speed limit associated with the unobserved link or historical speed over the unobserved link but without the traffic time penalty. In this example embodiment, the method adds the travel time penalty by adding the travel time penalty to the travel time of the unobserved link in the second traffic model that is based upon at least one of the speed limit associated with the unobserved link or the historical speed over the unobserved link. The method of an example embodiment adds a travel time penalty to the travel time of the unobserved link in the second traffic model by adding the travel time penalty such that the fastest path in the unobserved graph is slower than the fastest path in the observed graph, such as by at least a predetermined amount.

The method of an example embodiment categorizes the links of the second traffic model by classifying a link as unobserved in an instance in which the most likely route through the first traffic model fails to include at least the predetermined number of probe data points. The method of this example embodiment also evaluates the first traffic model by performing a bidirectional search of the link classified as unobserved to obtain additional probe data points and, in an instance in which the bidirectional search fails to obtain at least the predetermined number of probe data points, keeps the links classified as unobserved. The method of this example embodiment also categorizes the links of the second traffic model by categorizing the link previously classified as unobserved as observed in an instance in which the bidirectional search obtains at least the predetermined number of probe data points.

In another example embodiment, an apparatus for constructing a traffic model is provided that includes at least one processor and at least one memory comprising computer program code with the at least one memory and the computer program code configured to, with the at least one processor, cause the apparatus categorize links of a second traffic model as being either observed or unobserved based upon an evaluation of a first traffic model associated with a point in time prior to the point in time represented by the second traffic model. A link is observed in an instance in which a most likely route through the first traffic model transits over the link and includes at least a predetermined number of probe data points. Separately for an unobserved graph comprised of unobserved links and an observed graph comprised of observed links, the at least one memory and the computer program code are also configured to, with the at least one processor, cause the apparatus to determine a fastest path between common nodes that appear in each of the unobserved graph and the observed graph. In an instance in which the fastest path in the unobserved graph is at least as fast as the fastest path in the observed graph, the at least one memory and the computer program code are configured to, with the at least one processor, cause the apparatus to add a travel time penalty to a travel time of the unobserved link in the second traffic model, subsequent to the first traffic model. The at least one memory and the computer program code are further configured to, with the at least one processor, cause the apparatus to complete construction of the second traffic model including the travel time penalty added to the travel time of the unobserved link.

In an instance in which the fastest path in the unobserved graph is at least as fast as the fastest path in the observed graph, the at least one memory and the computer program code are configured to, with the at least one processor, cause the apparatus to establish the travel time of the unobserved link in the second traffic model based upon at least one of a speed limit associated with the unobserved link or a historical speed over the unobserved link but without the travel time penalty. The at least one memory and the computer program code are configured to, with the at least one processor, cause the apparatus of this example embodiment to add the travel time penalty by adding the travel time penalty to the travel time of the unobserved link in the second traffic model that is based upon at least one of the speed limit associated with the unobserved link or historical speed over the unobserved link. The at least one processor and the computer program code are configured to, with the at least one processor, cause the apparatus of an example embodiment to add a travel time penalty to a travel time of the unobserved link in the second traffic model by adding the travel time penalty such that the fastest path in the unobserved graph is slower than the fastest path in the observed graph, such as by at least a predetermined amount.

The at least one processor and the computer program code are configured to, with the at least one processor, cause the apparatus to categorize the links of the second traffic model by classifying a link as unobserved in an instance in which the most likely route through the first traffic model fails to include at least the predetermined number of probe data points. The at least one processor and the computer program code are configured to, with the at least one processor, cause the apparatus of this example embodiment to evaluate the first traffic model by performing a bidirectional search in the link classified as unobserved to obtain additional probe data points and categorizing the link previously classified as unobserved as unobserved in an instance in which the bidirectional search fails to obtain at least the predetermined number of probe data points. Further, the at least one processor and the computer program code are configured to, with the at least one processor, cause the apparatus of this example embodiment to categorize the links of the second traffic model by categorizing the link previously classified as unobserved as observed in an instance in which the bidirectional search obtains at least the predetermined number of probe data points.

In a further example embodiment, a computer program product is provided for constructing a traffic model with the computer program product comprising at least one non-transitory computer-readable storage medium having computer-executable program code portions stored therein with the computer-executable program code portions comprising program code instructions configured to categorize links of a second traffic model as being either observed or unobserved based upon an evaluation of a first traffic model associated with a point in time prior to the point in time represented by the second traffic model. A link is observed in an instance in which a most likely route through the first traffic model transits over the link and includes at least a predetermined number of probe data points. The computer-executable program code portions also comprise program code instructions configured to determine a fastest path between common nodes that appear on each of an unobserved graph and an observed graph with the determination performed separately for the unobserved graph comprised of unobserved links and the observed graph comprised of observed links. In an instance in which the fastest path in the unobserved graph is at least as fast as the fastest path in the observed graph, the computer-executable program code portions further comprise program code instructions configured to add a travel time penalty to a travel time of the unobserved link in a second traffic model, subsequent to the first traffic model. The computer-executable program code portions additionally comprise program code instructions configured to complete construction of the second traffic model including the travel time penalty added to the travel time of the unobserved link.

The computer-executable program code portions of an example embodiment further comprise program code instructions configured to, in an instance in which the fastest path in the unobserved graph is at least as fast as the fastest path in the observed graph, establish the travel time of the unobserved link in the second traffic model based upon at least one of a speed limit associated with the unobserved link or historical speed over the unobserved link but without the travel time penalty. The program code instructions configured to add the travel time penalty in this embodiment comprise program code instructions configured to add the travel time penalty to the travel time of the unobserved link in the second traffic model that is based upon at least one of the speed limit associated with the unobserved link or historical speed over the unobserved link. In an example embodiment, the program code instructions configured to add a travel time penalty to the travel time of the unobserved link in the second traffic model comprise program code instructions computed to add the travel time penalty such that the fastest path in the unobserved graph is slower than the fastest path in the observed graph.

The program code instructions configured to categorize the links of the second traffic model in accordance with an example embodiment comprise program code instructions configured to classify a link as unobserved in an instance in which the most likely route through the first traffic model fails to include at least the predetermined number of data points. In this example embodiment, the program code instructions configured to evaluate the first traffic model further comprise program code instructions configured to perform a bidirectional search of the link classified as unobserved to obtain additional probe data points and to categorize the link previously classified as unobserved as unobserved in an instance in which the bidirectional search fails to obtain at least a predetermined number of probe data points. In this example embodiment, the program code instructions configured to categorize the links of the second traffic model further comprise program code instructions configured to categorize the link previously classified as unobserved as observed in an instance in which the bidirectional search obtains at least the predetermined number of probe data points.

In yet another example embodiment, an apparatus for constructing a traffic model is provided that includes means for categorizing links of a second traffic model as being either observed or unobserved. A link is observed in an instance in which a most likely route through the first traffic model transits over the observed link and includes at least a predetermined number of probe data points. The apparatus of this example embodiment also includes means for determining a fastest path between common nodes that appear in each of an unobserved graph and an observed graph with the determination performed separately for the unobserved graph comprised of unobserved links and the observed graph comprised of observed links. In an instance in which the fastest path in the unobserved graph is at least as fast as the fastest path in the observed graph, the apparatus further includes means for adding a travel time penalty to a travel time of the unobserved link in a second traffic model, subsequent to the first traffic model. The apparatus additionally includes means for completing construction of the second traffic model including the travel time penalty added to the travel time of the unobserved link.

BRIEF DESCRIPTION OF THE DRAWINGS

Figure 1:
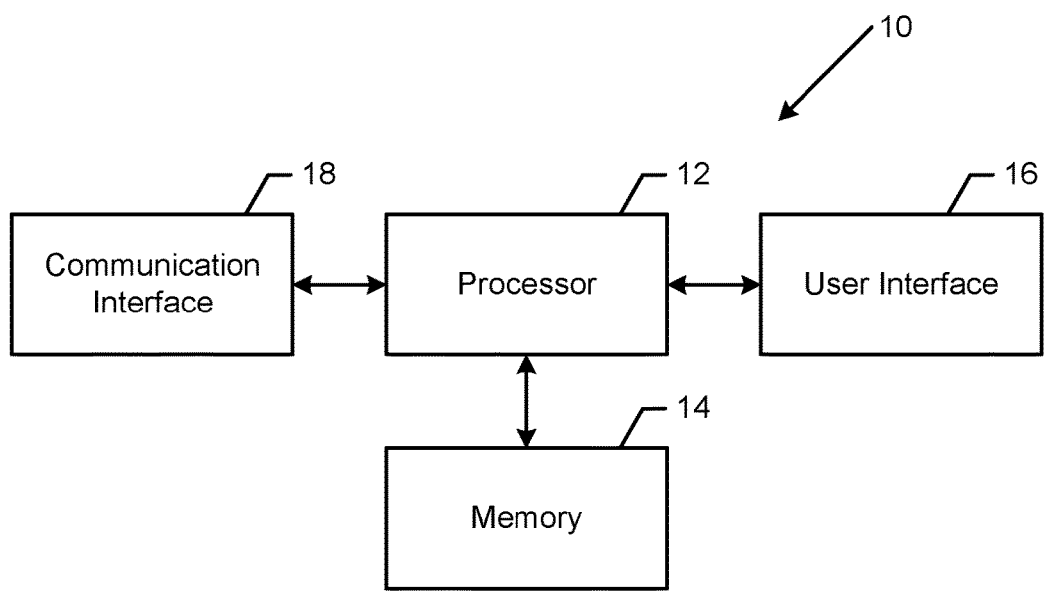
Figure 2:
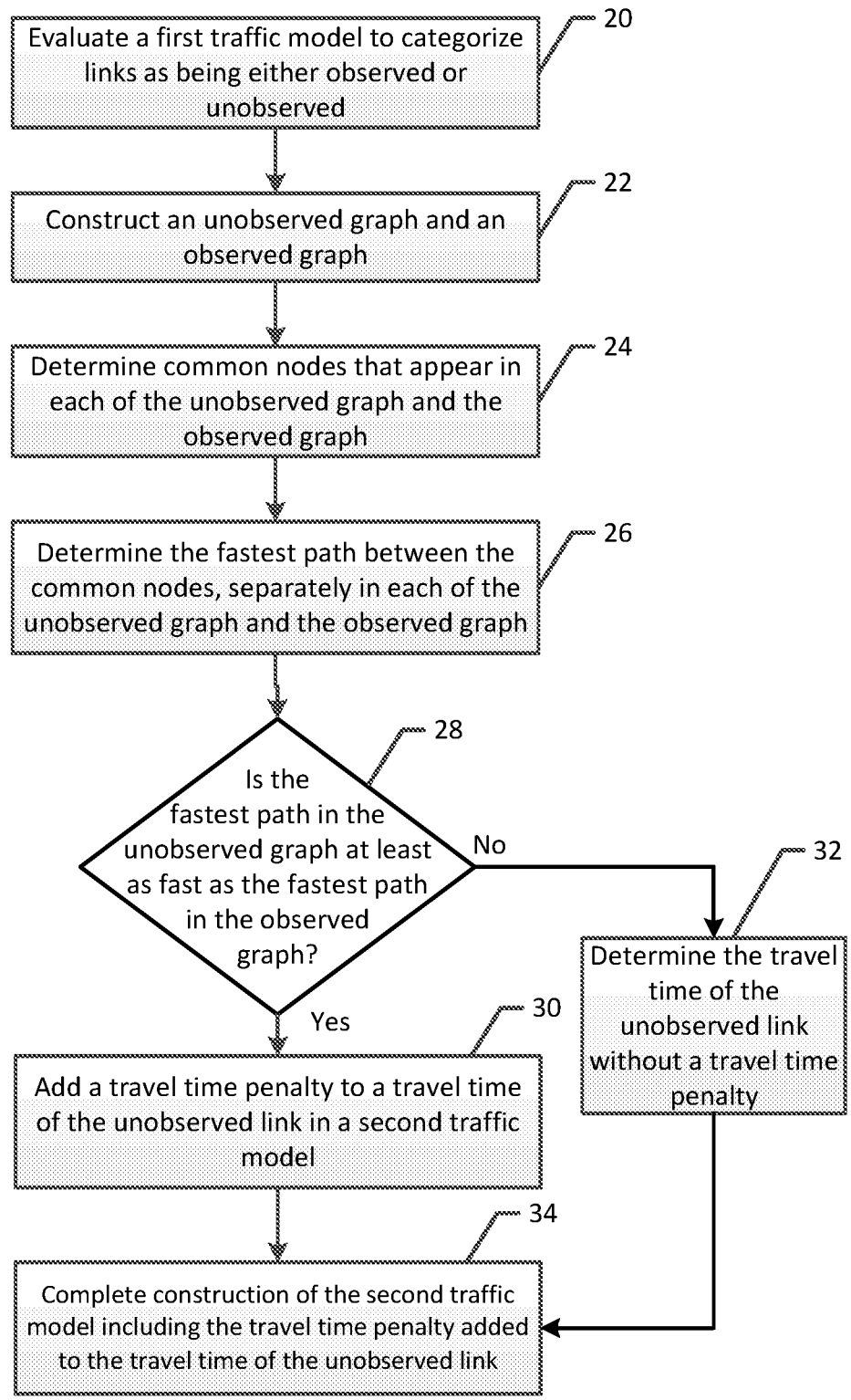
Figure 3:
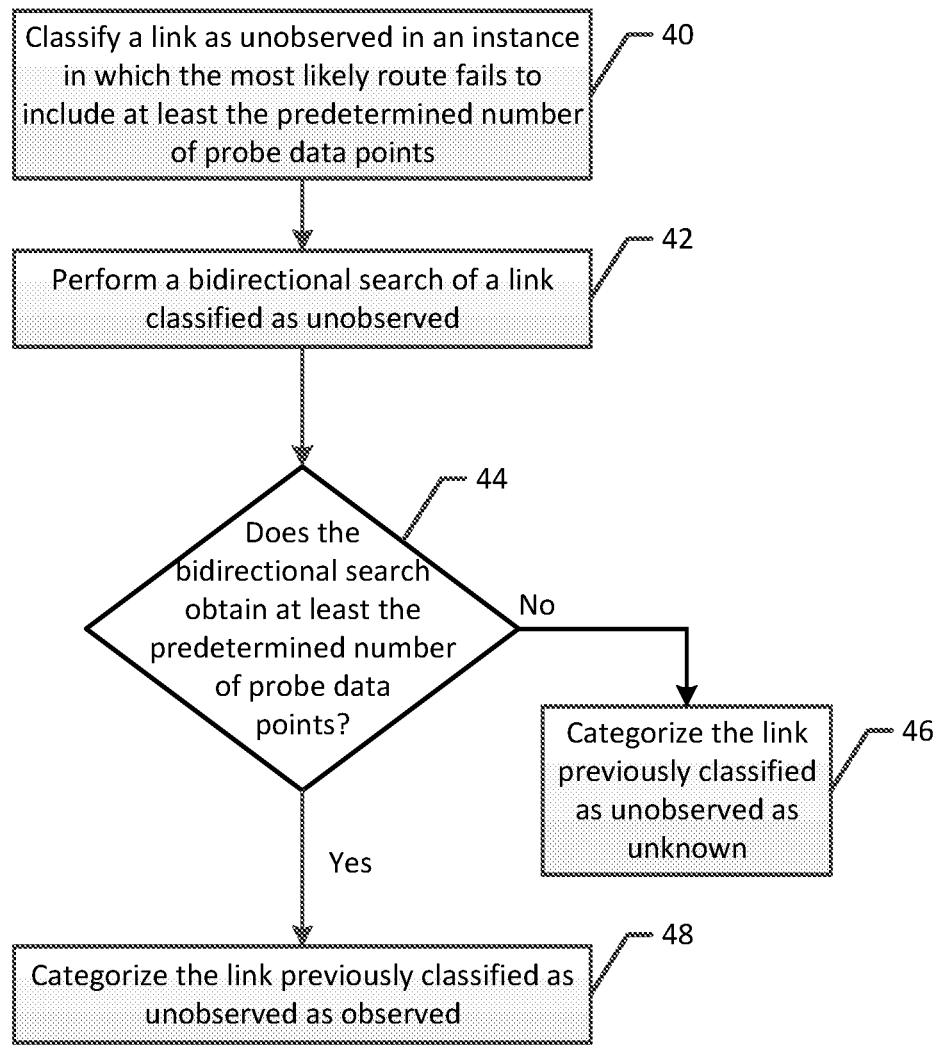
Figure 4:
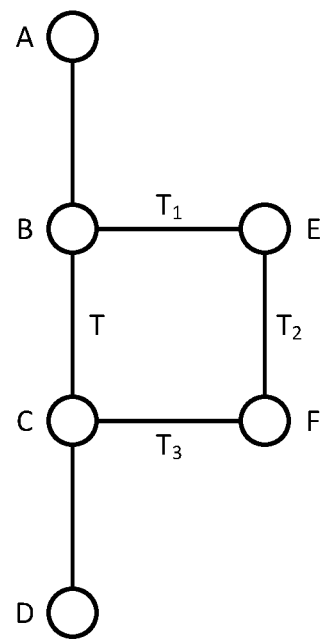
Figure 5:
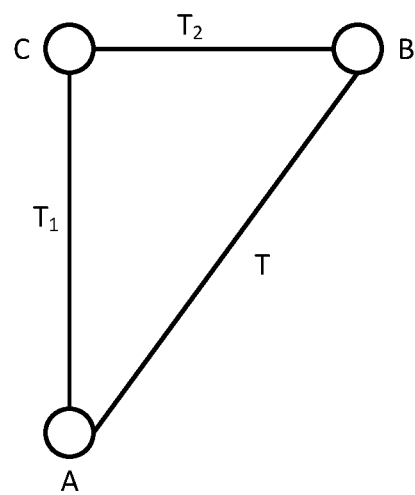
Figure 6:
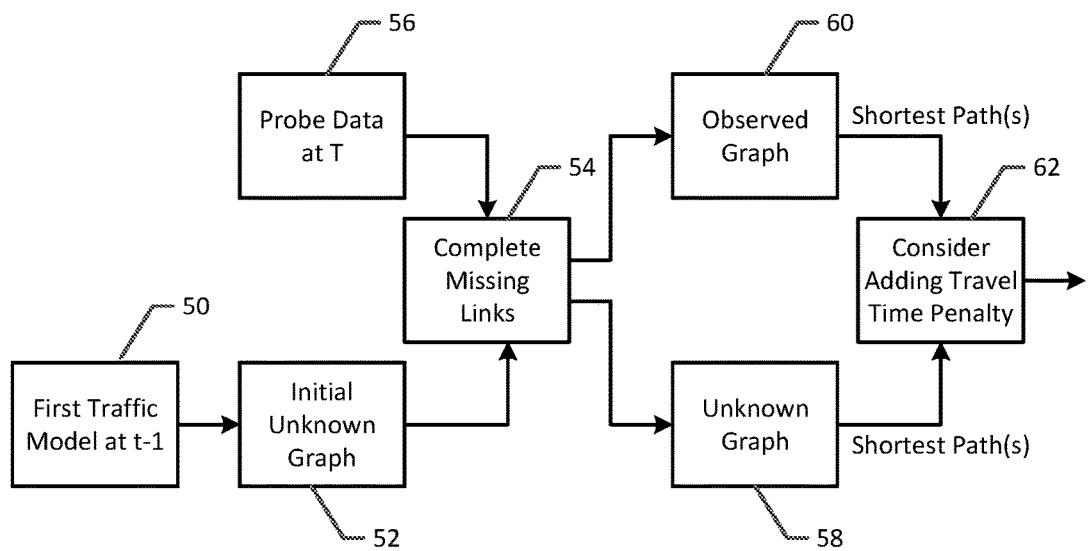

Having thus described certain example embodiments of the invention in general terms, reference will now be made to the accompanying drawings, which are not necessarily drawn to scale, and wherein:

FIG. 1 is a block diagram of an apparatus that may be specifically configured to construct a traffic model in accordance with an example embodiment to the present disclosure;

FIG. 2 is a flowchart illustrating operations performed, such as by the apparatus of FIG. 1, in accordance with an example embodiment of the present disclosure;

FIG. 3 is a flowchart of the operations performed, such as by the apparatus of FIG. 1, to evaluate the first traffic model in accordance with an example embodiment of the present disclosure;

FIG. 4 is a graphical representation of a portion of a second traffic model constructed in accordance with an example embodiment of the present disclosure;

FIG. 5 is a graphical representation of a portion of a different, second traffic model constructed in accordance with an example embodiment of the present disclosure; and FIG. 6 is a block diagram of a system for constructing a traffic model in accordance with an example embodiment of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A method, apparatus and computer program product are provided in accordance with an example embodiment for constructing a traffic model, such as a prediction of the speed of travel and, correspondingly, the time of travel over various links of a road network. The apparatus may be embodied by a variety of different computing devices, such as a Global Navigation Satellite System (GNSS), a routing and navigation system, a mapping system, a location tracking system, an advanced driver assistance system (ADAS), a server, a computer workstation, a personal computer, or a portable computing device carried by a passenger riding within a vehicle, such as a mobile terminal, a tablet computer or other portable computing device. In other embodiments, the apparatus may be embodied by a chip or chip set, such as one or more integrated circuits configured to perform the functions described below in relation to the construction of a traffic model. The resulting traffic model constructed in accordance with an example embodiment may be utilized for various purposes, such as by a navigation or other mapping application that utilizes the traffic model to construct routes from an origin to a destination, such as to construct routes that may be traversed in the shortest amount of time, and also to determine the estimated time of arrival at the destination following traversal of the route.

Although the apparatus configured to construct a traffic model may be configured in various manners, the apparatus 10 of an example embodiment is depicted in FIG. 1. As shown, the apparatus of this example embodiment includes, is associated with or otherwise is in communication with, a processor 12, a memory device 14, a communication interface 16 and optionally a user interface 18. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor, such as historical probe points. Additionally or alternatively, the memory device could be configured to store instructions for execution by the processor.

The processor 12 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 12 may be configured to execute instructions stored in the memory device 14 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 10 of an example embodiment also includes a communication interface 16 that may be any means such as a device or circuitry embodied in either hardware or a combination of hardware and software that is configured to receive and/or transmit data from/to other electronic devices in communication with the apparatus, such as by being configured to receive real time probe data points and to access a prior traffic model, that is, the first traffic model described below, and to provide the second traffic model to, for example, a routing and navigation system and/or to a database, cloud storage or other external memory device. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication.

As illustrated in FIG. 2, the apparatus 10 may also optionally include or otherwise be in communication with a user interface 18. The user interface may include a touch screen display, a keyboard, a mouse, a joystick or other input/output mechanisms. In some embodiments, the user interface, such as a display, speakers, or the like, may also be configured to provide output to the user. In this example embodiment, the processor 12 may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory device 14 and/or the like).

Traffic models evolve over time as the traffic flow fluctuates. Thus, a series of traffic models may be generated with each traffic model predicting the traffic flow at a different point in time. As discussed herein, a first traffic model may have been constructed for a first point in time with a second traffic model then being constructed based in part upon the first traffic model for a second point in time, subsequent to the first point in time. In this regard, the method, apparatus 10 and computer program product of an example embodiment employ an iterative approach in which the second traffic model is derived from the first traffic model, which is assumed to be in equilibrium. The second traffic model is then verified to still be in equilibrium. Each iteration generally consists of two passes with the cost of likely routes initially being inferred prior to inferring the costs of the unlikely routes.

As to the first pass, for every link, the sampling space of which a respective link is a part must be discovered in order to estimate the unbiased cost of the link. Thus, for every link, a route that is most likely passing through the link is identified prior to using the estimated cost of the route to infer the cost of the link. As to the second pass, the Nash equilibrium postulate is applied. In this regard, drivers are greedy and follow their optimal strategy, such as by choosing a route from A to B that minimizes a cost function. In the second pass, links that are not observed in the first pass are filtered out in order to avoid unlikely shortcuts that will vehicles should not take.

Referring now to FIG. 2, the operations performed in order to construct a traffic model are depicted. In the first pass, for a link L of the second traffic model, forward and backward scans from the link L are run to identify a path P that extends from point A to point B and passes through the link L, while also including links associated with at least a predetermined number of real time probe data points, that is, probe data points that have been collected following the first point in time represented by the first traffic model. A most likely route, such as the fastest route, through the first traffic model from point A to point B is also determined. In an instance in which the most likely route through the first traffic model fails to include the link L, the link L may be categorized as being unobserved. However, if the most likely route through the first traffic model includes the link L and also includes links associated with at least the predetermined number of real time probe data points, the link L may be categorized as observed and the cost, e.g., speed, of link L may be set to be the harmonic average of the real time probe data points associated with the link L. Alternatively, the cost of link L may be based on a self-correcting linear regression of the real time probe data points associated with the link L or to be defined as alpha*sigma_L+mean_L wherein alpha is defined as the average of the real time data points on other links of the most likely route, sigma_L is the standard deviation of the real time probe data points associated with link L and mean_L is the average of the real time probe data points associated with link L. If, however, if the most likely route through the first traffic model includes the link L but fails to include links that are associated with at least the predetermined number of real time probe data points, the link L may initially be categorized as unobserved, subject to further evaluation as described below. This process is repeated for each link of the second traffic model.

Probe data points are representative of travel along a road. The probe data points may be collected by a variety of different data collection devices, such as a global positioning system (GPS), navigation systems, location tracking systems or the like. These data collection devices may be carried by vehicles, for example, as the vehicles travel along the roads. For example, the data collection devices may be mounted within the vehicles, such as a component of a navigation system, an ADAS or the like, or may be carried by passengers within the vehicle, such as in an instance in which the data collection device is embodied by a mobile terminal, tablet computer or other portable computing device carried by the passenger riding within the vehicle. The data collection devices repeatedly capture probe data points as the data collection devices move along a respective road, such as by capturing probe data points at a predefined frequency. Each probe data point defines a location at which the probe data point was captured, such as in terms of latitude and longitude. The probe data point may also include or otherwise be associated with a variety of other information including, for example, one or more of the speed of the vehicle, the time at which the probe data point was captured, the heading of the vehicle, the identity of the vehicle and/or the data collection device, an identification of a session in which the probe data point is collected, etc.

The predetermined number of real time data points may be defined in various manners. In an example embodiment, however, the predetermined number of real time probe data points may be dependent upon the standard error of the mean of the real time probe data points. In this regard, since the route is fixed and the real time probe data points, the standard error of the mean of the real time probe data points is defined as sigma/sqrt(n) wherein sigma is the standard deviation of the real time probe data points and sqrt(n) is the square root of the number of real time probe data points. For example, if the sigma is 20%, 4 or more real time probe data points (n≥4) are required to have a standard error below 10%.

As shown in block 20 of FIG. 2 and in conjunction with the performance of the first pass, the apparatus 10 of an example embodiment includes means, such as the processor 12 or the like, for categorizing links, e.g., road segments, of the second traffic model as being either observed or unobserved based upon an evaluation of a first traffic model representative of a point in time prior to the point in time represented by the second traffic model. In this regard, the travel time associated with each link of the first traffic model may have been defined in various manners, such as in accordance an example embodiment of the present invention or by weighting the real time probe data points and the historical traffic information in the manner described above. Regardless, the first traffic model is assumed to be in equilibrium. In relation to the categorization of the links, a link is considered to be observed in an instance in which a most likely route through the first traffic model from point A to point B transits over the link and also includes at least the predetermined number of probe data points. The most likely route from point A to point B through the first traffic model may be defined in various manners. In an example embodiment, however, the most likely route through the first traffic model is defined as the route that may be traversed from point A to point B in the shortest amount of time as defined by the first traffic model at a first point in time. However, a most likely route through the first traffic model may be defined based upon the optimization of a different cost function, that is, a cost function other than transit time, in other embodiments.

The apparatus 10, such as the processor 12, is also configured to define the cost to be associated with a link of the second traffic model that is categorized as observed. The cost may be defined in various manners as described above including, for example, the harmonic average of the real time probe data points associated with the links of the most likely route from point A to point B, optionally clipped by the speed limit of the link.

In an instance in which a link of the most likely route fails to include at least a predetermined number of probe data points, the link may be further evaluated in an effort to associate additional probe data points with the respective link. As shown in block 40 of FIG. 3, the apparatus 10 of this example embodiment includes means, such as the processor 12 or the like, for classifying a link as unobserved in an instance in which the most likely route through the first traffic model that includes the link fails to include at least the predetermined number of probe data points. In this example embodiment, the apparatus also includes means, such as the processor or the like, for performing a bidirectional search of the link classified as unobserved to obtain additional probe data points. See block 42. The bidirectional search may be conducted on a local basis, both in a forward direction over the link and a backward direction over the link. Although various types of searches may be locally conducted, the search is performed in an example embodiment using the shortest path spanning tree algorithm. In an example embodiment, the bidirectional search is performed beginning at one end of the link, going backwards away from the link and searching up to a node of the known graph. Forward searching then commences at the opposite end of the link, going away from the link and searching through the links that come after the end of the link in question up to a node of the known graph. Probe points found on the fastest paths are used to complete the sampling space. The apparatus of this example embodiment also includes means, such as the processor or the like, for determining whether the bidirectional search obtains at least the predetermined number of probe data points for the link. See block 44. In an instance in which the bidirectional search fails to obtain at least the predetermined number of probe data points for the link, the apparatus includes means, such as the processor or the like, keeps the categorization of the link previously classified as unobserved as unobserved. See block 46.

Alternatively, in an instance in which the bidirectional search does obtain at least the predetermined number of probe data points for the link, the apparatus 10 includes means, such as the processor 12 or the like, for categorizing the link previously classified as unobserved as observed. See block 48. In this regard, the apparatus, such as the processor, is also configured to define the cost to be associated with this link of the second traffic model that has been re-categorized as observed. The cost may be defined in various manners as described above including, for example, the harmonic average of the real time probe data points associated with the link identified in the bidirectional search, optionally clipped so as not to exceed the speed limit of the link.

The foregoing process of categorizing the links as observed or unobserved is repeated for each link of the second traffic model. Once the links of the second traffic model have been categorized as being either observed or unobserved, the apparatus 10 of an example embodiment includes means, such as the processor 12 or the like, for constructing an unobserved graph comprised of the unobserved links and an observed graph comprised of the observed links. See block 22 of FIG. 2. In each graph, the links are connected to one another at respective nodes. The apparatus also includes means, such as the processor or the like, for determining the common nodes in the unobserved graph and the observed graph. See block 24 of FIG. 2. In this regard, the common nodes are those nodes that appear in each of the unobserved graph and the observed graph.

In terms of the second pass, the cost, e.g., speed, associated with the unobserved links may be determined by applying Nash equilibrium postulate such that the unobserved links are assigned a cost, e.g., a speed, that reduces or eliminates the likelihood that the cost will be undervalued based upon more greatly weighted historical traffic information. For each unobserved link L, backward and forward scans may be run through the second traffic model until links that are observed are reached. These links that are observed define the end points A and B for a path P that contains the unobserved link L. The fastest route Q through the second traffic model between end points A and B that utilizes only observed links is determined. This fastest route Q is considered the fastest observed route, while path P is an unobserved shortcut that transits over link L. The cost, e.g., speed, associated with link L of the second traffic model is then predicted so that the estimated time of arrival utilizing path P will be at least somewhat greater than the estimated time of arrival utilizing the fastest route Q.

By way of example and separately for the unobserved graph and the observed graph, the apparatus 10 of this example embodiment also includes means, such as the processor 12 or the like, for determining the fastest path between common nodes, e.g., a pair of common nodes, in the unobserved graph and the observed graph. See block 26 of FIG. 2. By way of example, there may be three common nodes designated A, B and C which, in turn, define three paths AB, BC and AC, each of which is evaluated independently with respect to the fastest path. The fastest path may be defined in various manners, such as by being based upon various cost functions. In an example embodiment, however, the fastest path is defined to be that path between the common nodes that appear in each of the unobserved graph and the observed graph for which the time to travel between the common nodes is predicted to be the least.

In an instance in which the fastest path in the unobserved graph is at least as fast as or faster than the fastest path in the observed graph, that is, in an instance in which the time required to travel the fastest path in the unobserved graph is less than or equal to the time required to travel the fastest path in the observed graph as shown in block 28 of FIG. 2, the apparatus 10 of an example embodiment includes means, such as the processor 12 or the like, for adding a travel time penalty to the travel time of the unobserved link in the second traffic model. See block 30 of FIG. 2. Thus, the apparatus, such as the processor, of this example embodiment is configured to determine the travel time of the unobserved link in the second traffic model to be equal to the travel time of the same link in the first traffic model, the travel time based upon the speed limit of the link or the travel time based upon the average historical speed over the link with the addition of a travel time penalty. In other words, in an instance in which a link is unobserved as a result of having fewer than the predetermined number of probe data points associated therewith, the travel time associated with the respective link is increased by the addition of a travel time penalty.

This addition of the travel time penalty is intended to offset the potential understatement of the travel time along the respective link based upon a more greatly weighted representation of the historical traffic information as a result of the relatively few probe data points associated with the link at the current point in time. Thus, a link having few probe data points, such as a result of a sluggish or blocked traffic flow, that otherwise may have a relatively small travel time calculated therefore based upon more greatly weighted historical probe information for the link may be assigned a larger travel time as a result of the addition of the travel time penalty. Conversely, in an instance in which the fastest path in the unobserved graph is slower than the fastest path in the observed graph as defined in terms of the time required to travel along the links of the shortest paths and as shown in block 28 of FIG. 2, the apparatus 10 of an example embodiment includes means, such as the processor 12 or the like, for establishing the travel time of the unobserved link in the second traffic model based upon at least one of the speed limit associated with the unobserved link and/or the historical speed over the unobserved link, but, in either instance, without the addition of the travel time penalty. See block 32 of FIG. 2. Thus, in an instance in which the travel time over the fastest path between the common nodes is slower via the unobserved graph than the observed graph, the assignment of travel time over the unobserved link in the second traffic model may be defined in a more conventional manner based on speed limits or historical speed over the unobserved link without a need to incorporate a travel time penalty as travel between the common nodes over the unobserved graph is already predicted to take longer than travel between the common nodes over the observed graph, such that a router is unlikely to rely upon the unobserved link in the generation of a route. As shown in block 34, the apparatus also includes means, such as the processor or the like, for completing construction of the second traffic model, such as by combining the graph of the links that comprise the road network with the cost, e.g., speed and/or travel time, associated with each of the links including the travel time penalty added to the travel time of the unobserved link.

The travel time penalty may be defined in various manners. In an example embodiment, the travel time penalty is based upon the speed limited associated with the unobserved link and/or the historical speed over the unobserved link. In this regard, the travel time penalty that is added to the travel time of the unobserved link may be based upon a speed lower than the speed limit associated with the unobserved link and/or lower than the historical speed over the unobserved link so as to increase the travel time over the unobserved link. The speed associated with the unobserved link may be reduced relative to the speed limit or the historical speed in various manners including by a predetermined amount or a predetermined percentage, such as 10%. Thus, the speed at which traffic is estimated to travel over the unobserved link may be 90% of the speed limit associated with the unobserved link or 90% of the historical speed over the unobserved link in an example embodiment. Alternatively, the travel time penalty may be defined such that the travel time over the fastest path in the unobserved graph is slower than the travel time over the fastest path in the observed graph, such as by at least a predetermined amount. Various predetermined amounts may be utilized depending upon the degree of bias that is desired, but, in an example embodiment, the travel time penalty that is added to the travel time of the unobserved link in the second model is defined such that the travel time over the fastest path between the common nodes in the unobserved graph is slower by a predetermined percentage, e.g., 10%, than the travel time over the fastest path between the common nodes in the observed graph.

In some embodiments, the travel time penalty may be based on the number of available probe points and/or on the time difference between the route on the unknown graph and the route on the known graph. With respect to the time difference between the route on the unknown graph and the route on the known graph, for example, in an instance in which the route on the known graph is almost the same as the alternate route in the unknown graph, a 10% penalty may be added to the alternate route in the unknown graph. In an instance in which the route on the known graph is about 10% longer than the alternate route in the unknown graph such that drivers may be taking the route on the known graph thinking (incorrectly) that it is quicker and/or trying to avoid traffic, a 25% penalty may be added to the alternate route in the unknown graph to account for the potential traffic. Further, in an instance in which the route on the known graph is definitively longer, such as 30% longer, than the route in the unknown graph such that the drivers are taking the route on the unknown graph to avoid heavy traffic, a 50% penalty may be added to the alternate route in the unknown graph to account for the heavy traffic. With respect to the number of available probe points, in an instance in which the route on the known graph is about 10% longer than the alternate route in the unknown graph and there a few probe points exhibiting some movement on the alternate route, the travel time penalty may be adjusted, such as by being increased. In an instance in which the route on the known graph is definitively longer, such as 30% longer, than the route in the unknown graph but there have not been probe points in a significant period of time along the alternative route, the travel time penalty on the alternative route may be substantially increased, such as to 100% as the alternative route may be blocked.

By way of example, FIG. 4 depicts several links of a road network. In traveling from the origin A to the destination D the most direct path of travel would include a sequence of link AB, link BC and link CD. Instead of traveling over link BC, a driver may, instead, travel over a sequence of links BE, EF and FC. In an instance in which the traffic is slowed over link BC, such as due to a traffic accident, so as to have travel time T, consideration may be given to travel over links BE, EF and FC as an alternative route. In an instance in which link EF also experiences a blockage, there will be few real time probe data points for links BE, EF and FC. As such, traditional approaches would estimate the travel time over links BE, EF and FC as $T_1$, $T_2$ and $T_3$, respectively, based more greatly upon historical traffic information which would underestimate the travel time by failing to take into account the current blockage on link EF. As a result of the underestimation by traditional approaches of the travel time over links BE, EF and FC, a router may direct a driver to leave the more direct route from origin A to destination D and to take the route comprised of links AB, BE, EF, FC and CD. As a result of the underestimation of the travel time along link EF due to the blockage upon link EF and the lack of real time probe data points, this route will prove quite slow for the driver and be suboptimal with the estimated time of arrival also being greatly understated. Conversely and in accordance with an example embodiment of the present disclosure, the few real time probe data points on links BE, EF and FC will cause links BE, EF and FC being treated as unobserved links. In an instance in which the travel times $T_1$, $T_2$ and $T_3$ over links BE, EF and FC based upon the historical traffic information is no more than the travel time T over link BC, an added transit time may be added to one or each of the transit times $T_1$, $T_2$ and $T_3$ associated with links BE, EF and FC. As such, in accordance with an example embodiment of the present disclosure, the sum of the travel times $T_1$, $T_2$ and $T_3$ over links BE, EF and FC, once the added travel time penalty has added thereto, will be greater than the travel time T over link BC. Thus, a router may identify the more direct route from origin A to destination D including link BC to be the quickest and may recommend to the driver to remain on link BC, notwithstanding the slowness of traffic flow therealong, so as to avoid even greater delays associated with the alternative route including links BE, EF and FC.

Similarly, FIG. 5 depicts a roadway consisting of links AB, AC and BC. In an instance in which a driver is to proceed from origin A to destination B, historical traffic information might suggest that the direct route along link AB be taken to minimize the travel time. However, in an instance in which there are few real time probe data points, such as fewer than the predetermined number of probe data points along link AB, and in which the travel time T predicted for link AB is no more than the aggregate travel time predicted for links AC and BC ($T_1+T_2$), a travel time penalty may be added to the transit time of link AB. As described above, the travel time penalty may be added since the relatively few number of real time probe data points along link AB may be indicative of a blockage or sluggishness on link AB such that the historical traffic information that is otherwise used to a greater degree to estimate the time of travel may not be representative of the current traffic conditions. Once the travel time penalty is added to the transit time T along link AB, the router may determine that the preferred route in terms of fastest travel time to include links AC and CB, which although longer in terms of distance allow traffic to move at a greater rate of speed. Although the travel time penalty may be defined in various manners, the travel time penalty may be defined in accordance with the example of FIG. 5 such that the resulting transit time following the addition of the travel time penalty to link AB is such that the transit time T along link AB is 20% greater than the aggregate transit time ($T_1+T_2$) along links AC and CD.

As such, the apparatus 10, such as the processor 12, of an example embodiment may modify the travel time along respective links, such as unobserved links, so as to avoid the identification of suboptimal routes based upon greatly weighted historic traffic information in instances in which there are few real time probe data and the historic traffic data may misrepresent the current conditions. By way of further explanation, FIG. 6 depicts a system for constructing a traffic model in accordance with an example embodiment. As shown in block 50, a first traffic model at a first instance in time (designated t−1) is provided. Based upon the first traffic model, an initial unobserved graph 52 is constructed along with an observed graph. Bidirectional searches of the links classified as unobserved are then conducted on a local basis such that those links initially classified as unobserved are re-categorized as observed in instances in which the bidirectional search obtains at least a predetermined number of real time probe data points from a second, subsequent instance in time (designated t). See blocks 54 and 56 of FIG. 6. Based upon the unobserved graph 58 and the observed graph 60 following the bidirectional searches as well as real time probe data points from the second instance in time (time=t), the fastest path between the common nodes that appear in each of the unobserved graph and the observed graph are determined and the travel time penalty is added to the travel time of the unobserved link in the second traffic model, that is, the traffic model for the current point in time t. See block 62. As such, the travel time along the unobserved link may be more accurately predicted and corresponding routes may be chosen and times of arrival estimated in a more reliable fashion.

Thus, the method, apparatus 10 and computer program product of an example embodiment more accurately construct a traffic model. In this regard, in instances in which traffic along a link is sluggish or blocked and there are few probe data points along the respective link, the addition of the travel time penalty by the method, apparatus and computer program product of an example embodiment reduces the likelihood of an inaccurate and overly optimistic prediction for the respective link based upon the historic traffic information. Thus, the routes that are constructed and the times of arrival that are estimated based upon the traffic model constructed in accordance with an example embodiment of the present invention may be more accurate and reliable. In a routing and navigation system, the resulting traffic model may then be utilized by a route planning component, such as may be embodied by the at least one processor 12 or by another computing device, in order to construct a more accurate and reliable route.

FIGS. 2, 3 and 6 illustrate flowcharts of an apparatus 10, method and computer program product according to an example embodiment of the invention. It will be understood that each block of the flowcharts, and combinations of blocks in the flowcharts, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by the memory device 14 of an apparatus employing an embodiment of the present invention and executed by the processor 12 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, some of which have been described above. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A routing and navigation system comprising:
a communication interface comprising circuitry configured to receive probe data points; and
at least one processor configured to categorize links of a second traffic model as being either observed or unobserved based upon an evaluation of a first traffic model associated with a point in time prior to the point in time represented by the second traffic model, wherein a link is observed in an instance in which a most likely route through the first traffic model transits over the link and includes at least a predetermined number of the probe data points received by the communication interface, wherein the at least one processor is also configured to determine, separately for an unobserved graph comprised of unobserved links and an observed graph comprised of observed links, a fastest path between common nodes that appear in each of the unobserved graph and the observed graph, wherein, in an instance in which the fastest path in the unobserved graph is at least as fast as the fastest path in the observed graph, the at least one processor is configured to add a travel time penalty to a travel time of the unobserved link in the second traffic model, subsequent to the first traffic model, and wherein the processor is configured to complete construction of the second traffic model including the travel time penalty added to the travel time of the unobserved link, wherein the at least one processor is also configured to utilize the second traffic model in conjunction with construction of a route or determination of an estimated time of arrival.

2. A routing and navigation system according to claim 1 wherein, in an instance in which the fastest path in the unobserved graph is at least as fast as the fastest path in the observed graph, the at least one processor is configured to establish the travel time of the unobserved link in the second traffic model based upon at least one of a speed limit associated with the unobserved link or historical speed over the unobserved link but without the travel time penalty.

3. A routing and navigation system according to claim 1 wherein the at least one processor is configured to add a travel time penalty to a travel time of the unobserved link in the second traffic model by adding the travel time penalty such that the fastest path in the unobserved graph is slower than the fastest path in the observed graph.

4. A routing and navigation system according to claim 3 wherein the at least one processor is configured to add the travel time penalty by adding the travel time penalty such that the fastest path in the unobserved graph is slower than the fastest path in the observed graph by at least a predetermined amount.

5. A method for constructing a traffic model, the method comprising:
categorizing links of a second traffic model as being either observed or unobserved based upon an evaluation of a first traffic model associated with a point in time prior to the point in time represented by the second traffic model, wherein a link is observed in an instance in which a most likely route through the first traffic model transits over the link and includes at least a predetermined number of probe data points;
separately for an unobserved graph comprised of unobserved links and an observed graph comprised of observed links, determining a fastest path between common nodes that appear in each of the unobserved graph and the observed graph;
in an instance in which the fastest path in the unobserved graph is at least as fast as the fastest path in the observed graph, adding a travel time penalty to a travel time of the unobserved link in the second traffic model, subsequent to the first traffic model;
completing construction of the second traffic model including the travel time penalty added to the travel time of the unobserved link; and
providing the second traffic model to a routing and navigation system in order to construct a route or estimate a time of arrival based thereupon.

6. A method according to claim 5 further comprising, in an instance in which the fastest path in the unobserved graph is at least as fast as the fastest path in the observed graph, establishing the travel time of the unobserved link in the second traffic model based upon at least one of a speed limit associated with the unobserved link or historical speed over the unobserved link but without the travel time penalty.

7. A method according to claim 6 wherein adding the travel time penalty comprises adding the travel time penalty to the travel time of the unobserved link in the second traffic model that is based upon at least one of the speed limit associated with the unobserved link or historical speed over the unobserved link.

8. A method according to claim 5 wherein evaluating the first traffic model comprises:

classifying a link as unobserved in an instance in which the most likely route through the first traffic model fails to include at least the predetermined number of probe data points;
performing a bidirectional search of the link classified as unobserved to obtain additional probe data points; and
categorizing the link previously classified as unobserved still as unobserved in an instance in which the bidirectional search fails to obtain at least the predetermined number of probe data points.

9. A method according to claim 8 wherein categorizing links further comprises categorizing the link previously classified as unobserved as observed in an instance in which the bidirectional search obtain at least the predetermined number of probe data points.

10. A method according to claim 5 wherein adding a travel time penalty to a travel time of the unobserved link in the second traffic model comprises adding the travel time penalty such that the fastest path in the unobserved graph is slower than the fastest path in the observed graph.

11. A method according to claim 10 wherein adding the travel time penalty comprises adding the travel time penalty such that the fastest path in the unobserved graph is slower than the fastest path in the observed graph by at least a predetermined amount.

12. An apparatus for constructing a traffic model, the apparatus comprising at least one processor and at least one memory comprising computer program code, the at least one memory and the computer program code configured to, with the at least one processor, cause the apparatus to:
categorize links of a second traffic model as being either observed or unobserved based upon an evaluation of a first traffic model associated with a point in time prior to the point in time represented by the second traffic model, wherein a link is observed in an instance in which a most likely route through the first traffic model transits over the link and includes at least a predetermined number of probe data points;
separately for an unobserved graph comprised of unobserved links and an observed graph comprised of observed links, determine a fastest path between common nodes that appear in each of the unobserved graph and the observed graph;
in an instance in which the fastest path in the unobserved graph is at least as fast as the fastest path in the observed graph, add a travel time penalty to a travel time of the unobserved link in the second traffic model, subsequent to the first traffic model;
complete construction of the second traffic model including the travel time penalty added to the travel time of the unobserved link; and
provide the second traffic model to a routing and navigation system in order to construct a route or estimate a time of arrival based thereupon.

13. An apparatus according to claim 12 wherein the at least one memory and the computer program code are further configured to, with the at least one processor, cause the apparatus to, in an instance in which the fastest path in the unobserved graph is at least as fast as the fastest path in the observed graph, establish the travel time of the unobserved link in the second traffic model based upon at least one of a speed limit associated with the unobserved link or historical speed over the unobserved link but without the travel time penalty.

14. An apparatus according to claim 13 wherein the at least one memory and the computer program code are configured to, with the at least one processor, cause the apparatus to add the travel time penalty by adding the travel time penalty to the travel time of the unobserved link in the second traffic model that is based upon at least one of the speed limit associated with the unobserved link or historical speed over the unobserved link.

15. An apparatus according to claim 13 wherein the at least one memory and the computer program code are configured to, with the at least one processor, cause the apparatus to evaluate the first traffic model by:
classifying a link as unobserved in an instance in which the most likely route through the first traffic model fails to include at least the predetermined number of probe data points;
performing a bidirectional search of the link classified as unobserved to obtain additional probe data points; and
categorizing the link previously classified as unobserved still as unobserved in an instance in which the bidirectional search fails to obtain at least the predetermined number of probe data points.

16. An apparatus according to claim 15 wherein the at least one memory and the computer program code are configured to, with the at least one processor, cause the apparatus to categorize the links by categorizing the link previously classified as unobserved as observed in an instance in which the bidirectional search obtain at least the predetermined number of probe data points.

17. An apparatus according to claim 13 wherein the at least one memory and the computer program code are configured to, with the at least one processor, cause the apparatus to add a travel time penalty to a travel time of the unobserved link in the second traffic model by adding the travel time penalty such that the fastest path in the unobserved graph is slower than the fastest path in the observed graph.

18. An apparatus according to claim 17 wherein the at least one memory and the computer program code are configured to, with the at least one processor, cause the apparatus to add the travel time penalty by adding the travel time penalty such that the fastest path in the unobserved graph is slower than the fastest path in the observed graph by at least a predetermined amount.

19. A computer program product for constructing a traffic model, the computer program product comprising at least one non-transitory computer-readable storage medium having computer-executable program code portions stored therein, the computer-executable program code portions comprising program code instructions configured to:
categorize links of a second traffic model as being either observed or unobserved based upon an evaluation of a first traffic model associated with a point in time prior to the point in time represented by the second traffic model, wherein a link is observed in an instance in which a most likely route through the first traffic model transits over the link and includes at least a predetermined number of probe data points;
separately for an unobserved graph comprised of unobserved links and an observed graph comprised of observed links, determine a fastest path between common nodes that appear in each of the unobserved graph and the observed graph;
in an instance in which the fastest path in the unobserved graph is at least as fast as the fastest path in the observed graph, add a travel time penalty to a travel time of the unobserved link in the second traffic model, subsequent to the first traffic model;
complete construction of the second traffic model including the travel time penalty added to the travel time of the unobserved link; and
provide the second traffic model to a routing and navigation system in order to construct a route or estimate a time of arrival based thereupon.

20. A computer program product according to claim 19 wherein the computer-executable program code portions comprise program code instructions configured to, in an instance in which the fastest path in the unobserved graph is at least as fast as the fastest path in the observed graph, establish the travel time of the unobserved link in the second traffic model based upon at least one of a speed limit associated with the unobserved link or historical speed over the unobserved link but without the travel time penalty.

21. A computer program product according to claim 20 wherein the program code instructions configured to add the travel time penalty comprises program code instructions configured to add the travel time penalty to the travel time of the unobserved link in the second traffic model that is based upon at least one of the speed limit associated with the unobserved link or historical speed over the unobserved link.

22. A computer program product according to claim 19 wherein the program code instructions configured to evaluate the first traffic model comprises program code instructions configured to:
classify a link as unobserved in an instance in which the most likely route through the first traffic model fails to include at least the predetermined number of probe data points;
perform a bidirectional search of the link classified as unobserved to obtain additional probe data points; and
categorize the link previously classified as unobserved as unobserved in an instance in which the bidirectional search fails to obtain at least the predetermined number of probe data points.

23. A computer program product according to claim 22 wherein the program code instructions configured to categorize the links comprises program code instructions configured to categorize the link previously classified as unobserved as observed in an instance in which the bidirectional search obtain at least the predetermined number of probe data points.

24. A computer program product according to claim 19 wherein the program code instructions configured to add a travel time penalty to a travel time of the unobserved link in the second traffic model comprise program code instructions configured to add the travel time penalty such that the fastest path in the unobserved graph is slower than the fastest path in the observed graph.

* * * * *